US009269073B2

United States Patent
Sammon et al.

(10) Patent No.: US 9,269,073 B2
(45) Date of Patent: Feb. 23, 2016

(54) VIRTUAL AGENDA PARTICIPANT

(71) Applicants: Michael J. Sammon, Watchung, NJ (US); Ajita John, Holmdel, NJ (US); Doree Duncan Seligmann, New York, NY (US)

(72) Inventors: Michael J. Sammon, Watchung, NJ (US); Ajita John, Holmdel, NJ (US); Doree Duncan Seligmann, New York, NY (US)

(73) Assignee: Avaya Inc., Basking Ridge, NJ (US)

( * ) Notice: Subject to any disclaimer, the term of this patent is extended or adjusted under 35 U.S.C. 154(b) by 240 days.

(21) Appl. No.: 13/623,587

(22) Filed: Sep. 20, 2012

(65) Prior Publication Data

US 2014/0082100 A1    Mar. 20, 2014

(51) Int. Cl.
*G06F 15/16* (2006.01)
*G06Q 10/10* (2012.01)

(52) U.S. Cl.
CPC ............ *G06Q 10/101* (2013.01); *G06Q 10/109* (2013.01)

(58) Field of Classification Search
CPC ..... G06Q 10/10; G06Q 10/109; G06Q 10/00; G06Q 10/06; G06Q 10/1095; G06Q 50/01; G06Q 10/06311; G06Q 10/063118; H04L 67/14; H04L 12/1813; H04L 67/02; H04L 65/403; H04L 12/1818; H04M 3/567; H04M 2201/42; H04M 2201/39; H04M 7/0027; H04M 2201/40; H04N 7/15; H04N 21/44213; G10L 15/22; H04Q 2213/1324
USPC ............. 379/202.01, 142.04, 93.21; 370/260, 370/280, 352; 726/3
See application file for complete search history.

(56) References Cited

U.S. PATENT DOCUMENTS

| | | | | |
|---|---|---|---|---|
| 5,999,208 | A * | 12/1999 | McNerney et al. | 348/14.08 |
| 7,447,608 | B1 * | 11/2008 | Poston et al. | 702/178 |
| 8,019,069 | B1 * | 9/2011 | Cyriac | H04M 3/563 379/201.01 |
| 2006/0224430 | A1 * | 10/2006 | Butt | G06Q 10/063116 705/7.16 |
| 2009/0006982 | A1 * | 1/2009 | Curtis | G06Q 10/10 715/753 |
| 2009/0271438 | A1 * | 10/2009 | Agapi | G06Q 10/1095 |
| 2010/0318399 | A1 * | 12/2010 | Li | G06Q 10/1093 705/7.18 |
| 2011/0107236 | A1 * | 5/2011 | Sambhar | 715/753 |
| 2012/0144320 | A1 * | 6/2012 | Mishra et al. | 715/753 |
| 2012/0323575 | A1 * | 12/2012 | Gibbon | G11B 27/28 704/246 |
| 2013/0139071 | A1 * | 5/2013 | Hoff | G06Q 10/1095 715/756 |

* cited by examiner

*Primary Examiner* — Brian J Gillis
*Assistant Examiner* — Kamran Mohammadi

(57) ABSTRACT

Systems, methods, and computer-readable storage media for managing meeting agendas in a meeting or conference via a virtual agenda participant. The system maintains, prior to a communication session, a conference agenda associated with the communication session. During the communication session, the system identifies, via a virtual entity, communication items associated with the communication session to yield identified communication items, wherein the virtual entity dynamically monitors the communication session and processes data associated with the communication session to identify the communication items. The system then compares, via the virtual entity, the conference agenda with the identified communication items to determine which items from the conference agenda have been addressed during the communication session.

19 Claims, 5 Drawing Sheets

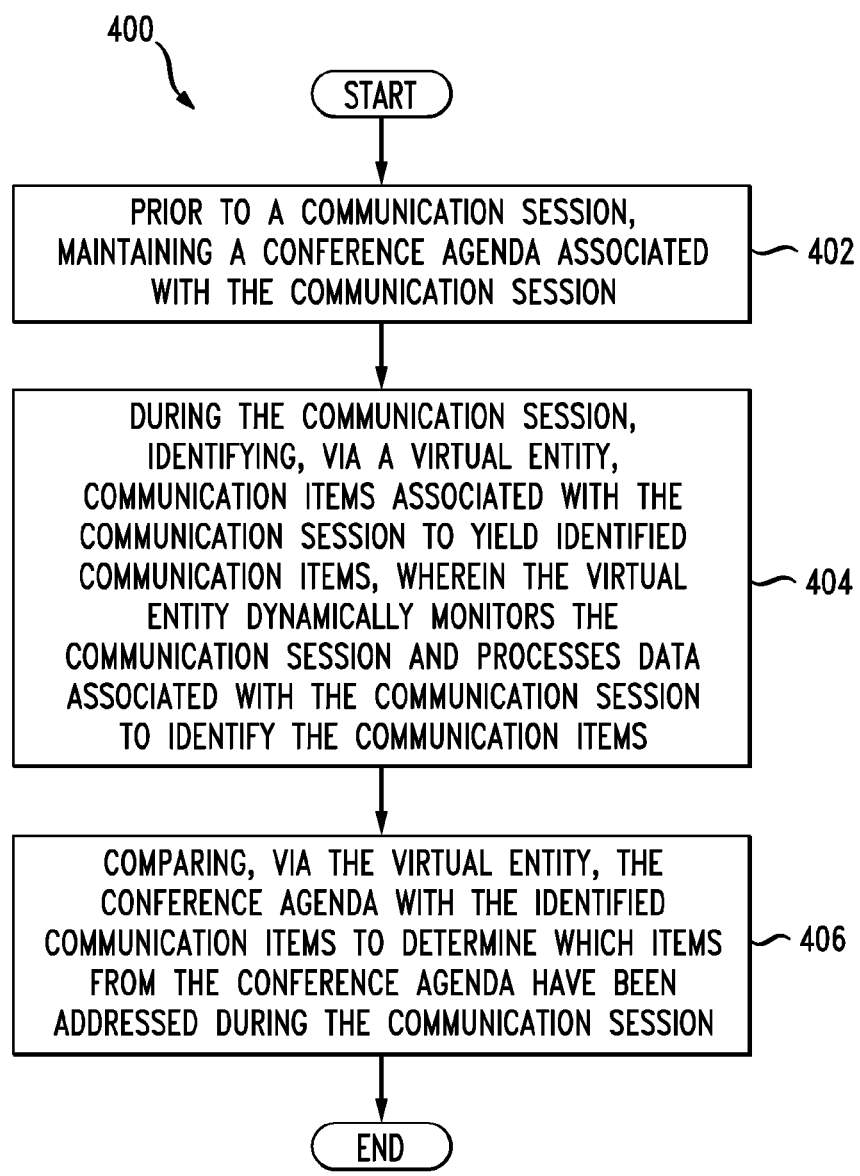

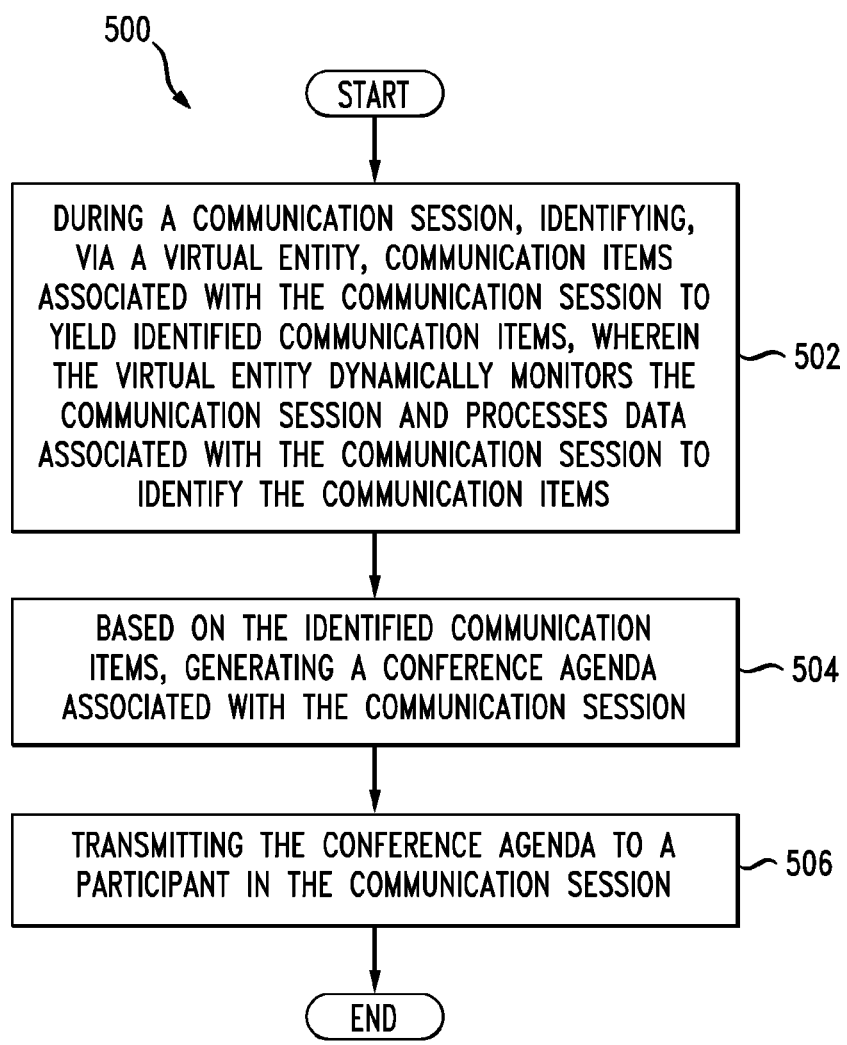

VIRTUAL AGENDA PARTICIPANT

BACKGROUND

1. Technical Field

The present disclosure relates to meeting agendas and more specifically to managing meeting agendas and addressed agenda items in a meeting.

2. Introduction

Meeting agendas help participants stay on topic during a meeting, and ensure that every topic is addressed during the meeting as intended, so a topic that the participants plan to address during the meeting is not overlooked or forgotten. Typically, a meeting participant is charged with the duty of making, managing, and editing the meeting agenda. Often, the same participant is also responsible for controlling the meeting, and ensuring that all items in the meeting agenda are addressed in the meeting—although the task is sometimes delegated to a separate participant. The person who controls the meeting, the meeting manager, usually marks or checks off agenda items as they are addressed in the meeting, to note that the agenda item has been addressed. However, the meeting manager sometimes forgets to mark or check off one or more agenda items that have been discussed. As a result, some agenda items are never addressed in the meeting or recorded in the meeting minutes, as such they are overlooked and forgotten.

Moreover, even the best meeting managers will, on occasion, forget to address important agenda items that are scheduled to be presented, discussed, or addressed in the meeting. Thus, despite the meeting manager's best intentions to follow the meeting agenda, some agenda items are often neglected during the meeting. And as time passes, it becomes harder for the meeting participants and managers to remember which agenda items were addressed and which were not.

Similarly, action items and future topic areas created during the course of the meeting are often forgotten, as both the meeting manager and meeting participants sometimes fail to write these down when they are discussed. These items are then neglected after the meeting, particularly as time passes and memories vanish. Current solutions merely provide online agenda programs. Unfortunately, however, the current solutions do not provide dynamic agendas with real-time updates, reminders, notifications and interactions.

SUMMARY

Additional features and advantages of the disclosure will be set forth in the description which follows, and in part will be obvious from the description, or can be learned by practice of the herein disclosed principles. The features and advantages of the disclosure can be realized and obtained by means of the instruments and combinations particularly pointed out in the appended claims. These and other features of the disclosure will become more fully apparent from the following description and appended claims, or can be learned by the practice of the principles set forth herein.

The approaches set forth herein can be implemented to efficiently manage and monitor a meeting and keep track of agenda items using a virtual participant. The virtual participant can monitor a meeting, determine if a topic in the meeting agenda has been addressed, and send a reminder or confirmation to participants to alert them that the topic has or has not been addressed. The virtual participant can dynamically generate updates, reminders, and action items to assist participants in the meeting. The virtual participant can also prepare an agenda for a subsequent meeting to facilitate the planning process for participants.

Disclosed are systems, methods, and non-transitory computer-readable storage media for managing meeting agendas in a meeting via a virtual agenda participant. The system first maintains, prior to a communication session, a conference agenda associated with the communication session. The conference agenda can be generated by the system based on a prior conference agenda, a prior action item, a tag, a calendar item, a prior communication session, user input, a schedule, a parameter, a communication history, a topic, a project, etc. Moreover, the system can generate the conference agenda by combining conference agendas from multiple participants. Here, the conference agenda can incorporate ideas, items, topics, and/or concerns that each of the multiple participants wishes to address in the communication session. The conference agenda can also be generated by a conference organizer and transmitted to the system to store and/or generate another conference agenda.

Next, the system identifies, during the communication session and via a virtual entity, communication items associated with the communication session to yield identified communication items, wherein the virtual entity dynamically monitors the communication session and processes data associated with the communication session to identify the communication items. The virtual entity can be a hardware and/or software entity configured to manage, maintain, update, modify, and/or monitor the conference agenda and the communication session. For example, the virtual entity can be a software representation of a virtual participant generated by the system. The communication items can include a tag, a topic, a keyword, a speaker identification, speech, an email, an instant message, a text message, a video message, an image, an audio message, a document, audio, video, etc.

The system then compares, via the virtual entity, the conference agenda with the identified communication items to determine which items from the conference agenda have been addressed during the communication session. The system can edit the conference agenda to note which items have been addressed in the communication session. Moreover, as an item in the conference agenda is addressed in the communication session, the system can dynamically edit the conference agenda to note that the item has been addressed. The system can then notify one or more participants in the communication session that the item has been addressed. For example, the system can send to participants a confirmation that an item from the conference agenda has been addressed in the communication session. The confirmation can include a spoken dialog, a text message, an email, an instant message, an audio alert, a visual alert, and so forth. The system can also update the conference agenda by adding identified communication items that are not in the conference agenda, and send the updated conference agenda to one or more participants in the communication session. This way, the system can ensure that the participants maintain a current conference agenda.

Further, the system can identify an item in the conference agenda that has not been addressed during the communication session, and send a reminder to a participant in the communication session, notifying the participant that the item in the conference agenda has not been addressed in the communication session. The reminder can be sent to the participant at a specific time determined by the system and/or specified by a parameter or configuration setting. For example, the specific time can be based on a schedule, a flag, a parameter, a preference, a threshold, and/or a user input. Moreover, the system can determine the specific time for sending the reminder based on the order of items in the conference agenda, the amount of time remaining in the communication session, the length of time that has transpired since the communication session started or ended, the number of items in the conference agenda, the time spent covering each of the items that have been addressed during the communication session, a detected departure from the conference agenda, etc.

The system can also send a message to one or more participants to remind participants of items in the meeting agenda and/or help guide the flow of the meeting. For example, the system can send a message to one or more participants in the communication session, specifying a next topic to be addressed in the communication session, an important topic that must be addressed in the communication session, the amount of time remaining in the communication session, the amount of time spent covering each item addressed in the communication session, the estimated amount of time necessary to address each of the remaining items in the conference agenda, the amount of time over an allotted time spent addressing an item, the difference between an estimated pace of the communication session and the actual pace of the communication session, etc. The message can include an audible message, a text message, a visual message, an email, an instant message, an audio alert, a visual alert, an image, a textual notification, an animation, a flag, and so forth.

In some embodiments, the system records the communication session as an audio conversation, segments the audio conversation based on respective topics, and generates an updated conference agenda based on the conference agenda and the topic segments. The system can also aggregate segments based on the respective topics. For example, the system can aggregate all of the segments associated with a specific topic. In other embodiments, the system segments the communication session based on respective topics, identifies respective speakers associated with the topic segments, tags the conference agenda based on the topic segments and the respective speakers, and edits the tagged conference agenda to note which of the items have been addressed in the communication session.

BRIEF DESCRIPTION OF THE DRAWINGS

FIG. 4 illustrates an example method embodiment for managing a meeting via a virtual agenda participant; and FIG. 5 illustrates an example method embodiment 500 for dynamically generating an agenda for a meeting.

DETAILED DESCRIPTION

Various embodiments of the disclosure are described in detail below. While specific implementations are described, it should be understood that this is done for illustration purposes only. Other components and configurations may be used without parting from the spirit and scope of the disclosure.

The present disclosure addresses the need in the art for accurate and effective ways to manage meeting agendas in a meeting or conference. A system, method and computer-readable media are disclosed which manage meeting agendas in a meeting via a virtual agenda participant. A brief introductory description of a basic general purpose system or computing device in FIG. 1, which can be employed to practice the concepts, is disclosed herein. A more detailed description of virtual agenda participants and meeting agendas will then follow. These variations shall be described herein as the various embodiments are set forth. The disclosure now turns to FIG. 1.

Figure 1:
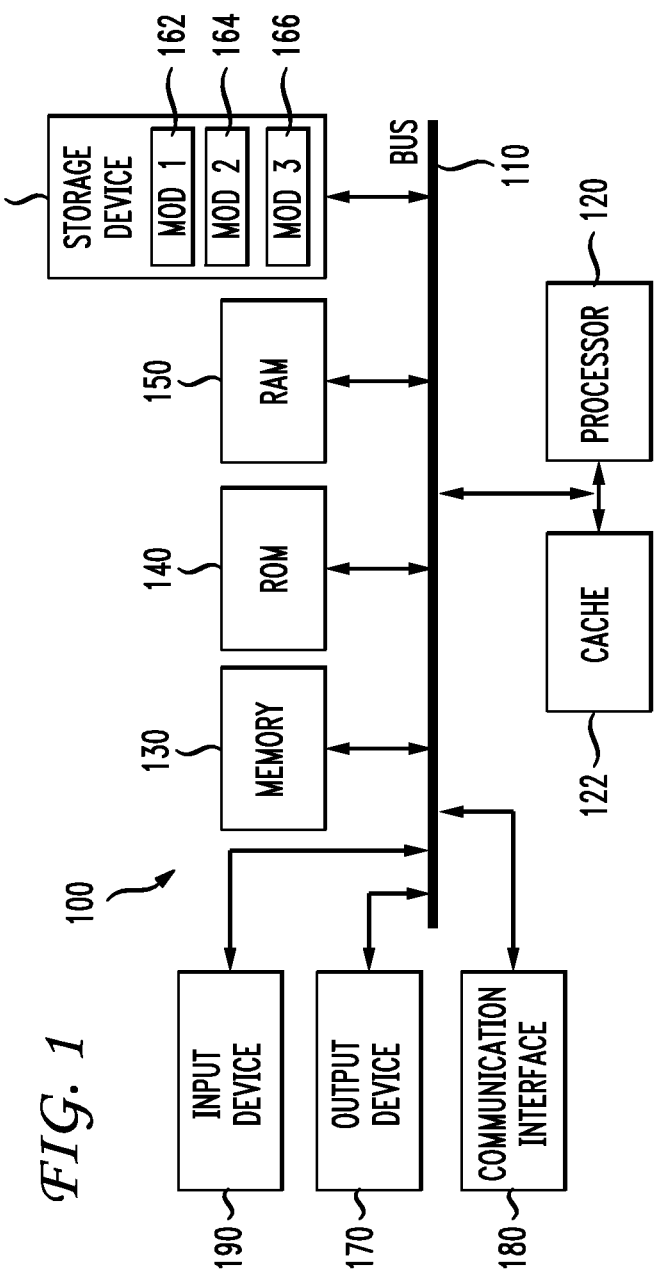
FIG. 1 illustrates an example system embodiment.

With reference to FIG. 1, an exemplary system includes a general-purpose computing device 100, including a processing unit (CPU or processor) 120 and a system bus 110 that couples various system components including the system memory 130 such as read only memory (ROM) 140 and random access memory (RAM) 150 to the processor 120. The computing device 100 can include a cache 122 of high speed memory connected directly with, in close proximity to, or integrated as part of the processor 120. The computing device 100 copies data from the memory 130 and/or the storage device 160 to the cache 122 for quick access by the processor 120. In this way, the cache provides a performance boost that avoids processor 120 delays while waiting for data. These and other modules can control or be configured to control the processor 120 to perform various actions. Other system memory 130 may be available for use as well. The memory 130 can include multiple different types of memory with different performance characteristics. It can be appreciated that the disclosure may operate on a computing device 100 with more than one processor 120 or on a group or cluster of computing devices networked together to provide greater processing capability. The processor 120 can include any general purpose processor and a hardware module or software module, such as module 1 162, module 2 164, and module 3 166 stored in storage device 160, configured to control the processor 120 as well as a special-purpose processor where software instructions are incorporated into the actual processor design. The processor 120 may essentially be a completely self-contained computing system, containing multiple cores or processors, a bus, memory controller, cache, etc. A multi-core processor may be symmetric or asymmetric.

The system bus 110 may be any of several types of bus structures including a memory bus or memory controller, a peripheral bus, and a local bus using any of a variety of bus architectures. A basic input/output (BIOS) stored in ROM 140 or the like, may provide the basic routine that helps to transfer information between elements within the computing device 100, such as during start-up. The computing device 100 further includes storage devices 160 such as a hard disk drive, a magnetic disk drive, a solid-state drive, an optical disk drive, tape drive or the like. The storage device 160 can include software modules 162, 164, 166 for controlling the processor 120. Other hardware or software modules are contemplated. The storage device 160 is connected to the system bus 110 by a drive interface. The drives and the associated computer-readable storage media provide nonvolatile storage of computer-readable instructions, data structures, program modules and other data for the computing device 100. In one aspect, a hardware module that performs a particular function includes the software component stored in a tangible computer-readable storage medium in connection with the necessary hardware components, such as the processor 120, bus 110, display 170, and so forth, to carry out the function. In another aspect, the system can use a processor and computer-readable storage medium to store instructions which, when executed by the processor, cause the processor to perform a method or other specific actions. The basic components and appropriate variations are contemplated depending on the type of device, such as whether the computing device 100 is a small, handheld computing device, a desktop computer, or a computer server.

Although the exemplary embodiment described herein employs the hard disk 160, other types of computer-readable media which can store data that are accessible by a computer, such as magnetic cassettes, flash memory cards, digital versatile disks, cartridges, random access memories (RAMs) 150, read only memory (ROM) 140, and the like, may also be used in the exemplary operating environment. Computer-readable storage media and devices expressly exclude transitory media such as energy, carrier signals, electromagnetic waves, and signals per se.

To enable user interaction with the computing device 100, an input device 190 represents any number of input mechanisms, such as a microphone for speech, a touch-sensitive screen for gesture or graphical input, keyboard, mouse, motion input, speech and so forth. An output device 170 can also be one or more of a number of output mechanisms known to those of skill in the art. In some instances, multimodal systems enable a user to provide multiple types of input to communicate with the computing device 100. The communications interface 180 generally governs and manages the user input and system output. There is no restriction on operating on any particular hardware arrangement and therefore the basic features here may easily be substituted for improved hardware or firmware arrangements as they are developed.

For clarity of explanation, the illustrative system embodiment is presented as including individual functional blocks including functional blocks labeled as a "processor" or processor 120. The functions these blocks represent may be provided through the use of either shared or dedicated hardware, including, but not limited to, hardware capable of executing software and hardware, such as a processor 120, that is purpose-built to operate as an equivalent to software executing on a general purpose processor. For example the functions of one or more processors presented in FIG. 1 may be provided by a single shared processor or multiple processors. (Use of the term "processor" should not be construed to refer exclusively to hardware capable of executing software.) Illustrative embodiments may include microprocessor and/or digital signal processor (DSP) hardware, read-only memory (ROM) 140 for storing software performing the operations described below, and random access memory (RAM) 150 for storing results. Very large scale integration (VLSI) hardware embodiments, as well as custom VLSI circuitry in combination with a general purpose DSP circuit, may also be provided.

The logical operations of the various embodiments are implemented as: (1) a sequence of computer implemented steps, operations, or procedures running on a programmable circuit within a general use computer, (2) a sequence of computer implemented steps, operations, or procedures running on a specific-use programmable circuit; and/or (3) interconnected machine modules or program engines within the programmable circuits. The computing device 100 shown in FIG. 1 can practice all or part of the recited methods, can be a part of the recited systems, and/or can operate according to instructions in the recited tangible computer-readable storage media. Such logical operations can be implemented as modules configured to control the processor 120 to perform particular functions according to the programming of the module. For example, FIG. 1 illustrates three modules Mod1 162, Mod2 164 and Mod3 166 which are modules configured to control the processor 120. These modules may be stored on the storage device 160 and loaded into RAM 150 or memory 130 at runtime or may be stored in other computer-readable memory locations.

Figure 2:
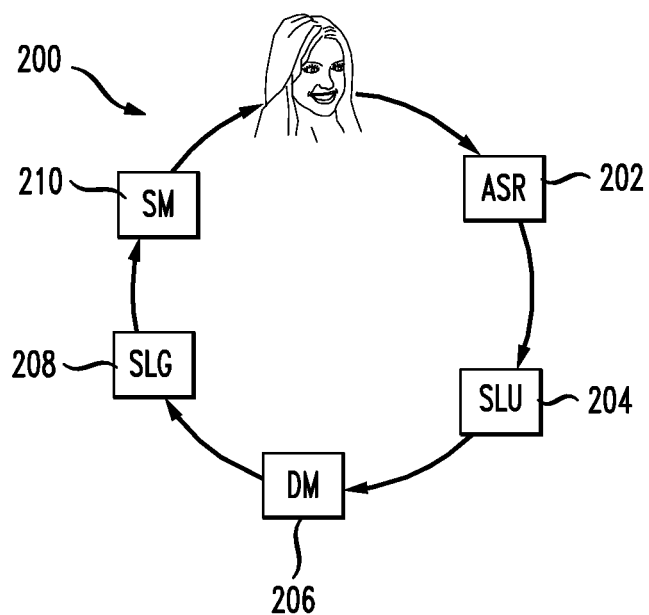
FIG. 2 illustrates a functional block diagram of an exemplary natural language spoken dialog system.

Having disclosed some components of a computing system, the disclosure now turns to FIG. 2, which illustrates a functional block diagram of an exemplary natural language spoken dialog system. Spoken dialog systems aim to identify intents of humans, expressed in natural language, and take actions accordingly to satisfy the human requests. Natural language spoken dialog system 200 can include an automatic speech recognition (ASR) module 202, a spoken language understanding (SLU) module 204, a dialog management (DM) module 206, a spoken language generation (SLG) module 208, and synthesizing module 210. The synthesizing module can be any type of speech output module. For example, it can be a module wherein one prerecorded speech segment is selected and played to a user. Thus, the synthesizing module can represent any type of artificial speech output. The virtual entity and other aspects of the present disclosure can be incorporated as part of the ASR module 202, and can be included as part of other components of the dialog system.

The ASR module 202 analyzes speech input and provides a textual transcription of the speech input as output. The ASR module 202 can also analyze speech and provide a tag and/or an index of the speech as output. SLU module 204 can receive the transcribed input and can use a natural language understanding model to analyze the group of words that are included in the transcribed input to derive a meaning from the input. The role of the DM module 206 is to interact in a natural way and help the user to achieve the task that the system is designed to support. The DM module 206 receives the meaning of the speech input from the SLU module 204 and determines an action, such as, for example, providing a response, based on the input. The SLG module 208 generates a transcription of one or more words in response to the action provided by the DM 206. The synthesizing module 210 receives the transcription as input and provides generated audible speech as output based on the transcribed speech.

Thus, the modules of system 200 recognize speech input, such as speech utterances, transcribe the speech input, tag the speech input, identify (or understand) the meaning of the transcribed speech, determine an appropriate response to the speech input, generate text of the appropriate response and from that text, generate audible "speech" from system 200, which the user then hears. In this manner, the user can carry on a natural language dialog with system 200. Those of ordinary skill in the art will understand the programming languages for generating and training ASR module 202 or any of the other modules in the spoken dialog system. Further, the modules of system 200 can operate independent of a full dialog system. For example, a computing device such as a smartphone (or any processing device having a phone capability) can include an ASR module wherein a user says "call mom" and the smartphone acts on the instruction without a "spoken dialog." As another example, a computing device can include an ASR module that searches an audio speech file, identifies a keyword and/or phrase in the speech and generates a tag and/or index of the keyword and/or phrase. As yet another example, a computing device can include one or more ASR modules for monitoring speech and identifying topics, speakers, and keywords in the speech. A module for performing speaker verification can join the system at any point or at multiple points in the cycle or can be integrated with any of the modules shown in FIG. 2.

Figure 3:
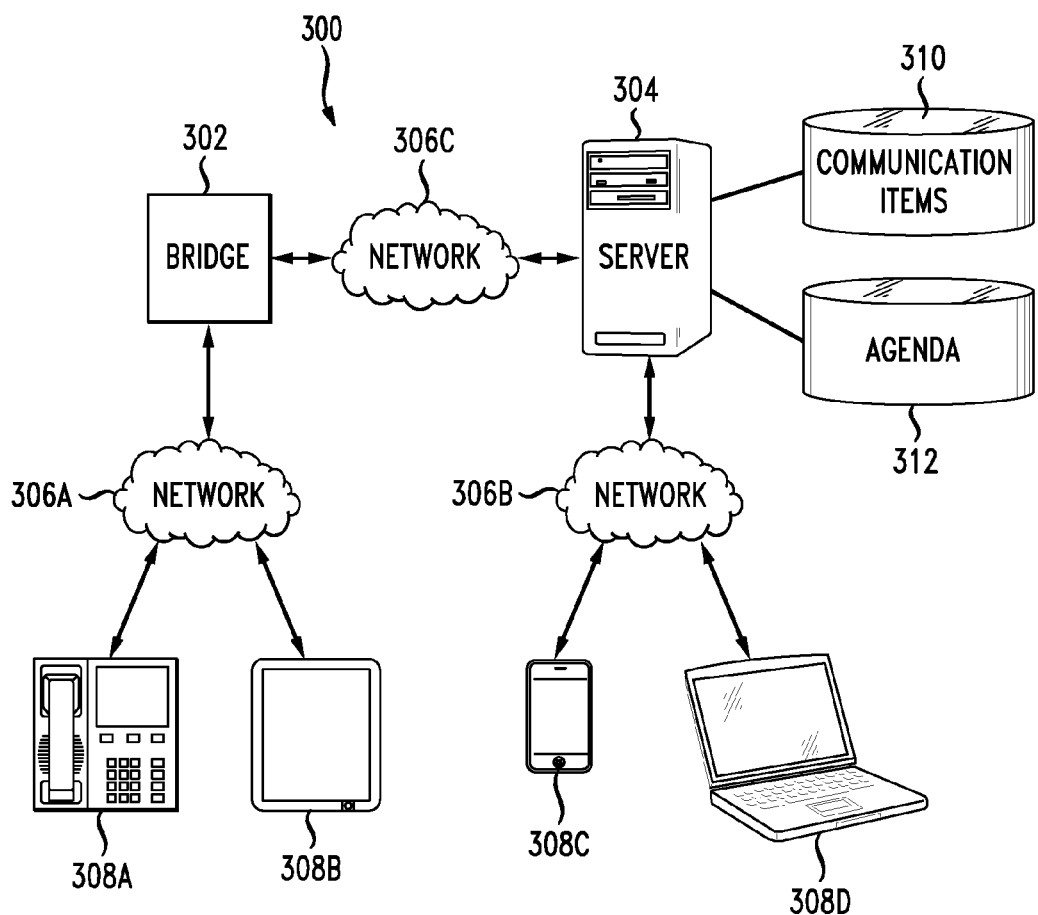
FIG. 3 illustrates an exemplary system architecture for keeping track of a meeting agenda through a virtual conference participant.

Having disclosed some components of a computing system and a natural language spoken dialog system, the disclosure now turns to the exemplary system architecture for keeping track of a meeting agenda through a virtual conference participant, shown in FIG. 3.

The architecture 300 includes a conference bridge 302 (audio and/or video), a smart conferencing server 304, and terminals 308A-D, which can be used by users to participate in a communication session, such as a conference call. The smart conferencing server 304, the conference bridge 302, and the terminals 308A-D can communicate via the networks 306A-C. The networks 306A-C can include a public network, such as the Internet, but can also include a private or quasi-private network, such as an intranet, a home network, a virtual private network (VPN), a shared collaboration network between separate entities, etc. Indeed, the principles set forth herein can be applied to many types of networks, such as local area networks (LANs), virtual LANs (VLANs), corporate networks, wide area networks, and virtually any other form of network. Moreover, the smart conferencing server 304 can communicate simultaneously with the conference bridge 302 and one or more of the terminals 308A-D.

The conference bridge 302 can be any network device, such as a server, configured to connect people participating in conference calls. The conference bridge 302 can also include other software-based capabilities, such as voice prompts, greetings, headcount, etc. The smart conferencing server 304 can process and analyze communication items, such as tags, speech, emails, instant messages, and spoken dialog, received from the conference bridge 302 and the terminals 308A-D. Moreover, the smart conferencing server 304 can include one or more ASR modules for monitoring speech in a conference and identifying topics, messages, tags, topic changes, agenda items, audio, speakers, and/or keywords in the speech. For example, the smart conferencing server 304 can include an ASR module that processes audio received from the conference bridge 302 and the terminals 308A-D, and identifies topics and communication items in the audio. The smart conferencing server 304 can also include an ASR module that searches an audio speech file, identifies a keyword and/or phrase in the speech, and generates a tag and/or index of the keyword and/or phrase.

As the terminals 308A-D participate in a conference, the smart conferencing server 304 can monitor the conference according to the meeting agenda for that conference. Here, the conferencing server 304 identifies communication items in the conference and stores the communication items in storage 310, which can be a local or remote storage location. The conferencing server 304 then compares the communication items with the meeting agenda for that conference, which is stored in the agenda storage 312, to determine which items in the meeting agenda have and have not been addressed in the conference, which items in the meeting agenda must be addressed in the conference, which items must be added or removed from the meeting agenda, etc. The conferencing server 304 can check off items in the meeting agenda as they are addressed in the conference. The conferencing server 304 can also send reminders, notifications, messages, confirmations, and/or alerts to the terminals 308A-D throughout the conference. For example, the conferencing server 304 can send a reminder to the terminals 308A-D that an item in the meeting agenda has not been addressed in the conference.

The terminals 308A-D in FIG. 3 include a conference phone 308A, a portable media player 308B, a mobile phone 308C, and a laptop computer 308D. Other exemplary terminals can include, as non-limiting examples, tablet computers, IP televisions, and vehicles equipped with mobile network access. Each of the terminals is capable of rendering media communications, including audio, video, text, and media in any other communication format.

Having disclosed some basic system components and concepts, the disclosure now turns to the exemplary method embodiments shown in FIGS. 4 and 5. For the sake of clarity, the methods are described in terms of an exemplary system 100, as shown in FIG. 1, configured to practice the methods. The steps outlined herein are exemplary and can be implemented in any combination thereof, including combinations that exclude, add, or modify certain steps.

FIG. 4 illustrates an example method embodiment 400 for managing a meeting via a virtual agenda participant. The system 100 first maintains, prior to a communication session, a conference agenda associated with the communication session (402). The conference agenda can be generated by the system 100 based on a prior conference agenda, a prior action item, a tag, a calendar item, a prior communication session, user input, a schedule, a parameter, a communication history, a topic, a project, etc. Moreover, the system 100 can generate the conference agenda by combining conference agendas from multiple participants. Here, the conference agenda can incorporate ideas, items, topics, and/or concerns that each of the multiple participants wishes to address in the communication session. The conference agenda can also be created by a user, such as a human organizer, and transmitted to the system 100 for storage and/or to be used by the system 100 to generate a new conference agenda.

In one embodiment, the system 100 receives the conference agenda from a human organizer prior to the communication session. For example, a human organizer can email and/or upload the conference agenda to the system 100 before the start of the communication session. The system 100 can then maintain the conference agenda from the human organizer prior to the communication session. In another embodiment, the system 100 generates the conference agenda via a virtual organizer. Here, the system 100 analyzes tags, audio items, calendar items, topic changes, messages, speech, action items and/or previous conference agendas to generate a conference agenda. The system 100 can generate the conference agenda prior to the communication session, but can also generate the conference agenda dynamically during the communication session. When generating the conference agenda dynamically during the communication session, the system 100 can analyze the speech and communication items, such as tags and messages, in the communication session, to dynamically generate the conference agenda during the communication session. This can be done in real time or close to real time.

In yet another embodiment, the system 100 generates the conference agenda using a blend of the human organizer approach and the virtual organizer approach. For example, the human organizer can submit the conference agenda to the system 100, and the system 100 can analyze the conference agenda to generate additional suggestions, which can be incorporated into the conference agenda to form a new conference agenda. Alternatively, the system 100 can generate the conference agenda via the virtual organizer, and allow the human organizer to make changes and/or additional suggestions, which can be similarly incorporated into the conference agenda to form a new conference agenda.

Next, the system 100 identifies, during the communication session and via a virtual entity, communication items associated with the communication session to yield identified communication items, wherein the virtual entity dynamically monitors the communication session and processes data associated with the communication session to identify the communication items (404). The virtual entity can be a hardware and/or software entity configured to create, manage, maintain, update, modify, and/or monitor the conference agenda and the communication session. For example, the virtual entity can be a graphical representation of a virtual agent participant generated by the system 100. The communication items can include a tag, a topic, a topic change, a keyword, a speaker identification, speech, an email, an instant message, a text message, a video message, an image, an audio message, a document, audio, video, etc.

The communication session can include a single communication session, such as a meeting, but can also include a set of communication sessions. Moreover, a communication session can include multiple modalities. Thus, the communication session can refer to one or more emails, one or more wikis, one or more messages, one or more audio conversations, etc. In cases where the communication session includes a set of communication sessions, the conference agenda can be associated with the set of communication sessions. Moreover, the communication items can also be associated with the set of communication sessions. For example, the system 100 can maintain a conference agenda associated with a set of meetings. During the course of the several meetings, the system 100 can identify communication items in the several meetings. The system 100 can then use the conference agenda and communication items to compute which items from the conference agenda have been addressed, computed, and/or discussed, as further explained in step 406.

In one embodiment, the system 100 identifies topic changes in the communication session and generates tags identifying the topic changes. The system 100 can then segment the communication session by topics based on the topic changes, even if the system 100 does not know what the topics are. The topic changes can be detected based on utterances that are characteristic of a topic change, such as "next," "let's move on," "as follows," etc. The system 100 can also identify topic areas as an interaction proceeds, and apply the identified topic areas to unconnected segments of the communication session and/or a different communication session. For example, the system 100 may identify a topic during the communication session. The discussion of the topic may subsequently end or shift to another topic, but later continue during the course of the interaction. As another example, a topic may be discussed during a communication session and later reviewed at the end of the communication session. In this scenario, the topic would be discussed twice—once during the discussion and again in the review—and the system 100 would identify both instances and link the unconnected segments according to the topic.

The information relating to the topics and topic changes could also be used to specify topic coverage preferences in a fine grained manner. For example, topic coverage may be configured to include several parts, such as identification of action items, setting a date, setting accountability, etc. The system 100 can then verify that the various parts are completed and assist participants in completing all of the related parts associated with the various items.

The system 100 then compares, via the virtual entity, the conference agenda with the identified communication items to determine which items from the conference agenda have been addressed during the communication session (406). The system 100 can edit the conference agenda to note which items have been addressed in the communication session. Moreover, as an item in the conference agenda is addressed in the communication session, the system 100 can dynamically edit the conference agenda to note that the item has been addressed. The system 100 can then notify one or more participants in the communication session that the item has been addressed. For example, the system 100 can send to participants a confirmation that an item from the conference agenda has been addressed in the communication session. The confirmation can include a spoken dialog, a text message, an email, an instant message, an audio alert, a visual alert, and so forth. The system 100 can also update the conference agenda by adding identified communication items that are not in the conference agenda, and send the updated conference agenda to one or more participants in the communication session. This way, the system 100 can ensure that the participants maintain a current conference agenda.

In one embodiment, the system 100 analyzes, during the communication session, tags, calendar items, and/or audio associated with the communication session, and determines if agenda topics from the conference agenda have been discussed. When the system 100 detects that a topic has been discussed, the system 100 can send, via the virtual entity, an audio message, an email, and/or a text-based message to one or more participants requesting a confirmation that the topic has been discussed. Alternatively, when the system 100 detects that a topic has been discussed, the system 100 can mark the item in the conference agenda as discussed and send a confirmation to one or more participants after the communication session, or simply mark the item as discussed without ever sending a confirmation to any participant. The system 100 can also identify action items and topic areas addressed in the communication session which are not in the conference agenda, and add these action items and topic areas to the conference agenda, marking them as having been addressed in the communication session. Moreover, the system 100 can augment the conference agenda with tags, such as speaker tags, topic tags, action item tags, alert tags, confirmation tags, identification tags, time tags, input tags, importance tags, etc.

Further, the system 100 can identify an item in the conference agenda that has not been addressed during the communication session, and send a reminder to a participant in the communication session, notifying the participant that the item in the conference agenda has not been addressed. The reminder can be sent to the participant at a specific time determined by the system 100 and/or specified by a parameter or configuration setting. For example, the specific time can be based on a schedule, a flag, a parameter, a preference, a threshold, and/or a user input. Moreover, the system 100 can determine the specific time for sending the reminder based on the order of items in the conference agenda, the amount of time remaining in the communication session, the length of time that has transpired since the communication session started or ended, the number of items in the conference agenda, the time spent covering each of the items that have been addressed during the communication session, a detected departure from the conference agenda, etc.

Moreover, the system 100 can gather statistics to determine what topics and/or agenda items have been addressed, how much time has been spent on the different topics and/or agenda items that have been addressed, how many times the conference agenda has been updated during the communication session, how many times have the different topics and/or agenda items have been addressed, how many notifications have been sent to the participants, etc. The system 100 can include a notification system and/or summary and reporting system for notifying and/or reporting information generated using the gathered statistics. The statistics can also be used to plan future communication sessions and/or generate future conference agendas.

The system 100 can also send a message to one or more participants to remind participants of items in the meeting agenda and/or help guide the flow of the meeting. For example, the system 100 can send a message to one or more participants in the communication session, specifying a next topic to be addressed in the communication session, a topic that must be addressed in the current communication session due to exigent circumstances, the amount of time remaining in the communication session, the amount of time the participants have spent covering each item addressed in the communication session, the estimated amount of time necessary to address each of the remaining items in the conference agenda, the amount of time over an allotted time that the participants have spent addressing an item, the difference between an estimated pace of the communication session and the actual pace of the communication session, etc. The message can include an audible message, a text message, a visual message, an email, an instant message, an audio alert, a visual alert, an image, a textual notification, an animation, a flag, and so forth.

In one embodiment, the system 100 records the communication session as an audio conversation, segments the audio conversation based on respective topics, and generates an updated conference agenda based on the conference agenda and the topic segments. The system 100 can also aggregate segments based on the respective topics. For example, the system 100 can aggregate all of the segments associated with a specific topic. In another embodiment, the system 100 segments the communication session based on respective topics, identifies respective speakers associated with the topic segments, tags the conference agenda based on the topic segments and the respective speakers, and edits the tagged conference agenda to note which of the items have been addressed in the communication session.

After the communication session, the system 100 can confirm that various agenda items were discussed, verify action items and assignments, and update the conference agenda for subsequent meetings. If there was no conference agenda prior to the communication, and the system 100 has developed a conference agenda covering the various items addressed in the communication session, the system 100 can send this conference agenda it has developed to one or more participants in the communication session as a reminder of the conversation/discussion. The system 100 can also record an audio conversation in the communication session, and create an agenda identifying what topics were addressed in the audio conversation and noting, for each of the topics, the respective time in the audio conversation in which the respective topic was addressed. The system 100 can then send the recorded audio conversation and/or agenda to one or more participants as a reminder of the conversation/discussion.

FIG. 5 illustrates an example method embodiment 500 for dynamically generating an agenda for a meeting. First, during a communication session, the system 100 identifies, via a virtual entity, communication items associated with the communication session to yield identified communication items, wherein the virtual entity dynamically monitors the communication session and processes data associated with the communication session to identify the communication items (502). Based on the identified communication items, the system 100 then generates a conference agenda associated with the communication session (504). The system 100 can also generate the conference agenda based on input from one or more participants, and/or prior conference agendas. For example, the system 100 can request input from one or more participants, and update the conference agenda based on the input from the participant(s).

After generating the conference agenda, the system 100 transmits the conference agenda to a participant in the communication session (506). The system 100 can also transmit the conference agenda to other participants, or all the participants in the communication session. The system 100 can also store the conference agenda and/or transmit it to a centralized location so the participants can access the conference agenda. Participants can use the conference agenda as a reminder of what items were addressed during the communication session. The system 100 can also use the conference agenda when creating future conference agendas for subsequent meetings.

Embodiments within the scope of the present disclosure may also include tangible and/or non-transitory computer-readable storage media for carrying or having computer-executable instructions or data structures stored thereon. Such tangible computer-readable storage media can be any available media that can be accessed by a general purpose or special purpose computer, including the functional design of any special purpose processor as described above. By way of example, and not limitation, such tangible computer-readable media can include RAM, ROM, EEPROM, CD-ROM or other optical disk storage, magnetic disk storage or other magnetic storage devices, or any other medium which can be used to carry or store desired program code means in the form of computer-executable instructions, data structures, or processor chip design. When information is transferred or provided over a network or another communications connection (either hardwired, wireless, or combination thereof) to a computer, the computer properly views the connection as a computer-readable medium. Thus, any such connection is properly termed a computer-readable medium. Combinations of the above should also be included within the scope of the computer-readable media.

Computer-executable instructions include, for example, instructions and data which cause a general purpose computer, special purpose computer, or special purpose processing device to perform a certain function or group of functions. Computer-executable instructions also include program modules that are executed by computers in stand-alone or network environments. Generally, program modules include routines, programs, components, data structures, objects, and the functions inherent in the design of special-purpose processors, etc. that perform particular tasks or implement particular abstract data types. Computer-executable instructions, associated data structures, and program modules represent examples of the program code means for executing steps of the methods disclosed herein. The particular sequence of such executable instructions or associated data structures represents examples of corresponding acts for implementing the functions described in such steps.

Other embodiments of the disclosure may be practiced in network computing environments with many types of computer system configurations, including personal computers, hand-held devices, multi-processor systems, microprocessor-based or programmable consumer electronics, network PCs, minicomputers, mainframe computers, and the like. Embodiments may also be practiced in distributed computing environments where tasks are performed by local and remote processing devices that are linked (either by hardwired links, wireless links, or by a combination thereof) through a communications network. In a distributed computing environment, program modules may be located in both local and remote memory storage devices.

The various embodiments described above are provided by way of illustration only and should not be construed to limit the scope of the disclosure. Various modifications and changes may be made to the principles described herein without following the example embodiments and applications illustrated and described herein, and without departing from the spirit and scope of the disclosure.

We claim:

1. A method comprising:
   prior to a communication session, generating a conference agenda associated with the communication session;
   during the communication session, identifying, by a virtual entity comprising a graphical representation of a virtual participant in the communication session, at least one of an email, an instant message, a text message, an image, or a document referenced during the communication session to yield an identified communication item, wherein the virtual entity is configured to monitor the conference agenda and the communication session;
   comparing, via the virtual entity, the conference agenda with the identified communication item to determine which agenda items from the conference agenda have been addressed during the communication session;
   updating the conference agenda during the communication session to add the identified communication item that is not in the conference agenda, to yield an updated conference agenda; and
   sending the updated conference agenda to a participant in the communication session.

2. The method of claim 1, further comprising sending, to a participant in the communication session, a confirmation that an agenda item from the conference agenda has been addressed in the communication session, wherein the confirmation comprises one of a spoken dialog, a text message, an email, an instant message, an audio alert, and a visual alert.

3. The method of claim 1, further comprising:
   recording the communication session as an audio conversation;
   segmenting the audio conversation based on respective topics to yield topic segments; and
   generating an updated conference agenda based on the conference agenda and the topic segments.

4. The method of claim 1, further comprising:
   identifying an agenda item in the conference agenda that has not been addressed during the communication session; and
   sending, to a participant in the communication session, a reminder notifying the participant that the agenda item in the conference agenda has not been addressed in the communication session, wherein the reminder is sent to the participant at a time that is determined based on one of an ordering of items in the conference agenda, an amount of time remaining in the communication session, and a length of time that has transpired since the communication session started.

5. The method of claim 1, further comprising sending, to a participant in the communication session, a message specifying one of a next topic to be addressed in the communication session and an important topic that must be addressed in the communication session.

6. The method of claim 5, wherein the message is one of an audible message, a text message, a visual message, an email, an instant message, an audio alert, and a visual alert.

7. The method of claim 1, wherein the conference agenda is further compared with a speech identified during the communication session to determine which agenda items have been addressed during the communication session.

8. The method of claim 1, wherein the conference agenda is generated by the virtual entity based on one of a prior conference agenda, a prior action item, a tag, a calendar item, and a prior communication session.

9. The method of claim 1, further comprising modifying the conference agenda to note which items in the conference agenda have been addressed in the communication session.

10. The method of claim 1, further comprising, as an agenda item in the conference agenda is addressed in the communication session, modifying the conference agenda to note that the agenda item has been addressed in the communication session.

11. The method of claim 10, further comprising notifying a participant in the communication session that the agenda item has been addressed in the communication session.

12. The method of claim 1, further comprising receiving, via the virtual entity, the conference agenda from a conference organizer.

13. The method of claim 1, further comprising generating, via the virtual entity, the conference agenda by combining conference agendas from multiple participants, wherein the conference agenda incorporates one of ideas, topics, and concerns that each of the multiple participants wishes to address in the communication session.

14. The method of claim 1, further comprising:
    segmenting the communication session based on respective topics to yield topic segments;
    identifying respective speakers associated with the topic segments;
    tagging the conference agenda based on the topic segments and the respective speakers to yield a tagged conference agenda;
    modifying the tagged conference agenda to note which of the agenda items in the tagged conference agenda have been addressed in the communication session.

15. A system comprising:
    a processor; and
    a computer-readable storage medium storing instructions which, when executed by the processor, cause the processor to perform operations comprising:
       prior to a communication session, generating a conference agenda associated with the communication session;
       during the communication session, identifying, by a virtual entity comprising a graphical representation of a virtual participant in the communication session, at least one of an email, an instant message, a text message, an image, or a document referenced during the communication session to yield an identified communication item, wherein the virtual entity is configured to monitor the conference agenda and the communication session;
       comparing, via the virtual entity, the conference agenda with the identified communication item to determine which agenda items from the conference agenda have been addressed during the communication session;
       updating the conference agenda during the communication session to add the identified communication item that is not in the conference agenda, to yield an updated conference agenda; and
       sending the updated conference agenda to a participant in the communication session.

16. The system of claim 15, wherein the computer-readable storage medium stores additional instructions which, when executed by the processor, cause the processor to perform further operations comprising:
    as an agenda item in the conference agenda is addressed in the communication session, modifying the conference agenda to note that the agenda item has been addressed in the communication session.

17. The system of claim 15, wherein the computer-readable storage medium stores additional instructions which, when executed by the processor, cause the processor to perform further operations comprising:

sending, to a participant in the communication session, a confirmation that an agenda item from the conference agenda has been addressed in the communication session, wherein the confirmation comprises one of a spoken dialog, a text message, an email, an instant message, an audio alert, and a visual alert.

18. A computer-readable storage device storing instructions which, when executed by a processor, cause the processor to perform operations comprising:

prior to a communication session, generating a conference agenda associated with the communication session;

during the communication session, identifying, by a virtual entity comprising a graphical representation of a virtual participant in the communication session, at least one of an email, an instant message, a text message, an image, or a document referenced during the communication session to yield an identified communication item, wherein the virtual entity is configured to monitor the conference agenda and the communication session; and comparing, via the virtual entity, the conference agenda with the identified communication item to determine which agenda items from the conference agenda have been addressed during the communication session;

updating the conference agenda during the communication session to add the identified communication item that is not in the conference agenda, to yield an updated conference agenda; and sending the updated conference agenda to a participant in the communication session.

19. The computer-readable storage device of claim 18, storing additional instructions which, when executed by the processor, cause the processor to perform further operations comprising:

identifying an agenda item in the conference agenda that has not been addressed during the communication session; and sending, to a participant in the communication session, a reminder notifying the participant that the agenda item in the conference agenda has not been addressed in the communication session, wherein the reminder is sent to the participant at a time that is determined based on one of an ordering of items in the conference agenda, an amount of time remaining in the communication session, and a length of time that has transpired since the communication session started.

* * * * *